United States Patent [19]

Denk

[11] Patent Number: 4,852,245

[45] Date of Patent: Aug. 1, 1989

[54] TOOTHLESS STATOR ELECTRICAL MACHINE CONSTRUCTION METHOD

[75] Inventor: Joseph Denk, Manhattan Beach, Calif.

[73] Assignee: Allied-Signal Inc., Morris Township, Morris County, N.J.

[21] Appl. No.: 107,150

[22] Filed: Oct. 9, 1987

Related U.S. Application Data

[62] Division of Ser. No. 800,184, Nov. 20, 1985, Pat. No. 4,709,180.

[51] Int. Cl.$^4$ ............................................. H02K 15/00
[52] U.S. Cl. ......................................... 29/596; 29/606
[58] Field of Search ..................... 29/596, 605, 606; 310/42, 194, 154, 61, 64, 65

[56] References Cited

U.S. PATENT DOCUMENTS

| | | | |
|---|---|---|---|
| 2,411,781 | 11/1946 | Fell | 310/61 |
| 2,607,816 | 8/1952 | Ryder et al. | 29/596 |
| 2,695,969 | 11/1954 | Yates | 29/598 |
| 3,241,111 | 3/1966 | Sandstrom | 29/596 |
| 3,405,297 | 10/1968 | Madsen | 310/258 |
| 3,909,647 | 9/1975 | Peterson | 310/261 |
| 3,914,859 | 10/1975 | Pierson | 29/606 |
| 4,363,986 | 12/1982 | Joho et al. | 310/194 |
| 4,409,502 | 10/1983 | McCabria | 310/61 |
| 4,466,182 | 8/1984 | Lamatsch et al. | 29/596 |

FOREIGN PATENT DOCUMENTS

| | | | |
|---|---|---|---|
| 2628235 | 1/1978 | Fed. Rep. of Germany | 310/154 |
| 158614 | 12/1979 | Japan | 310/194 |

Primary Examiner—P. W. Echols
Attorney, Agent, or Firm—David B. Abel; James W. McFarland

[57] ABSTRACT

A stator for use with a permanent magnet rotor electrical machine is disclosed which stator eliminates ferromagnetic teeth previously used in stator cores. The stator of the present invention uses a winding support structure made of non-magnetizable, non-conductive material to support the stator windings, which may advantageously be prewound prior to installation on the winding support structure. The stator is easily adaptable to liquid cooling, and has substantially reduced losses due to its toothless design.

6 Claims, 3 Drawing Sheets

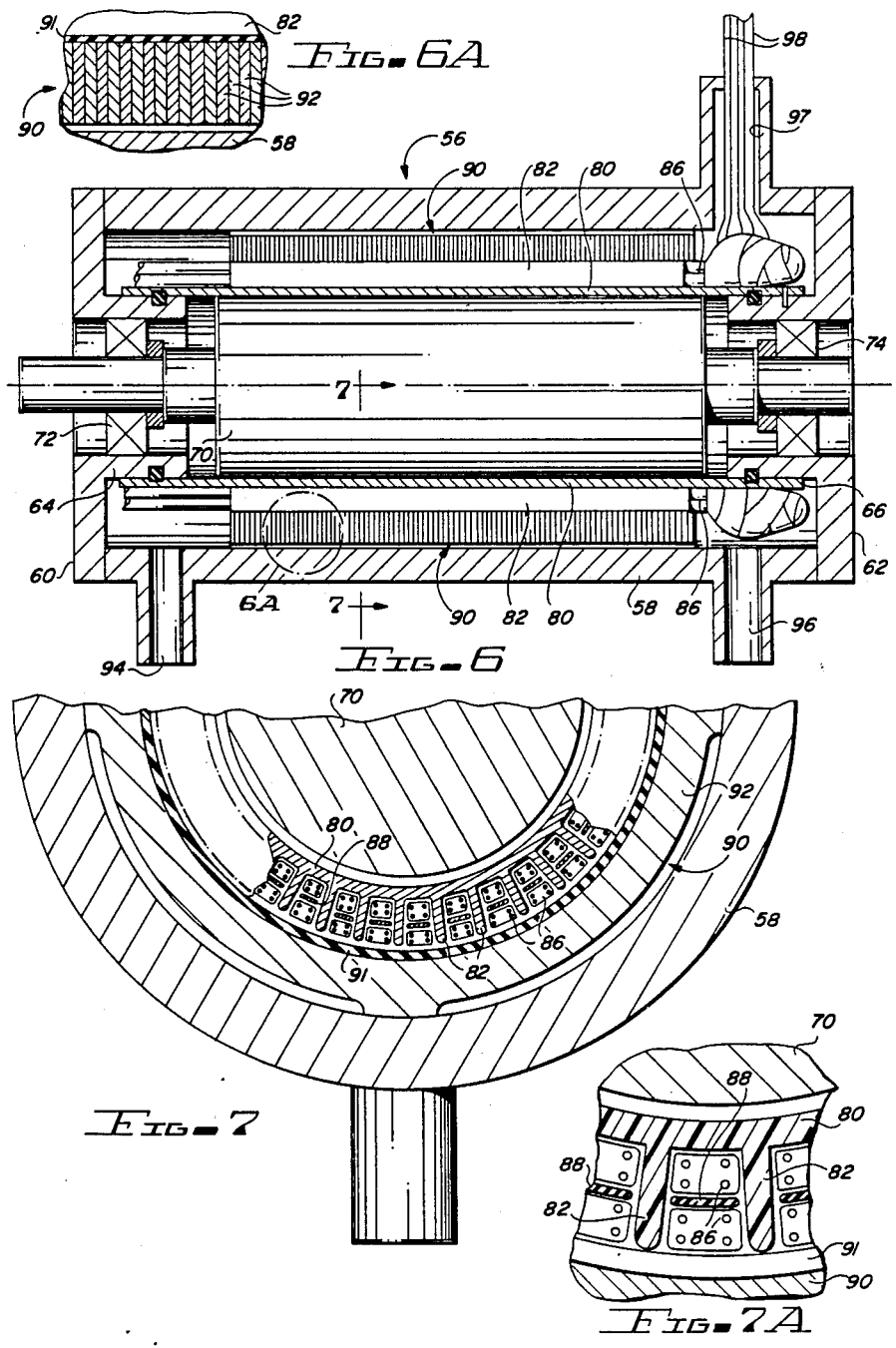

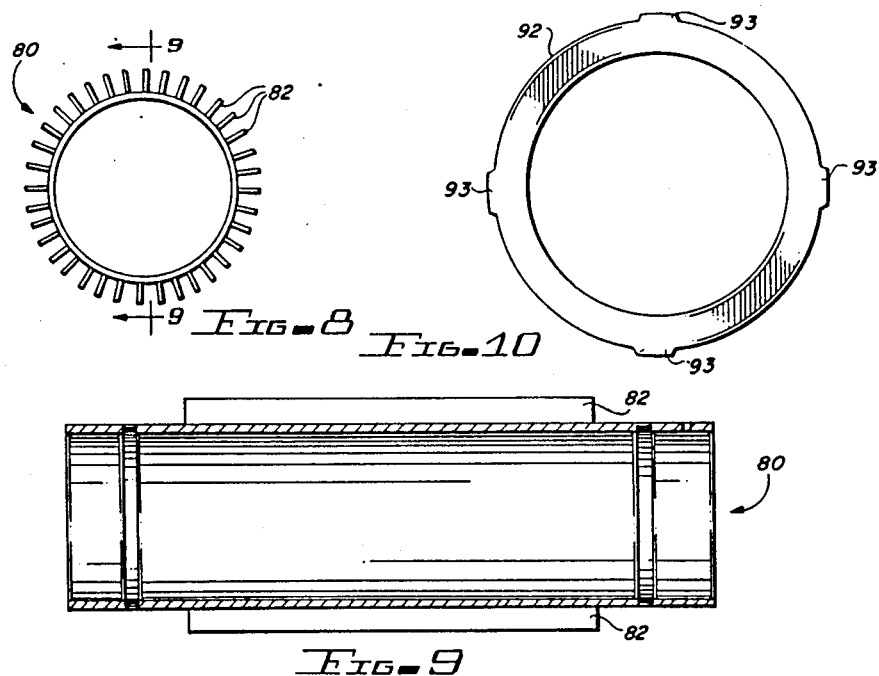
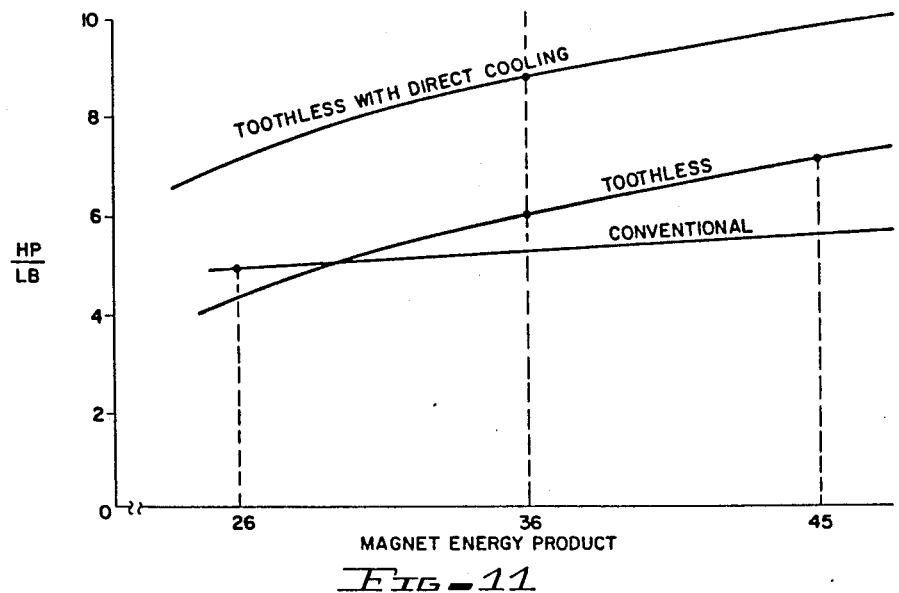

TOOTHLESS STATOR ELECTRICAL MACHINE CONSTRUCTION METHOD

This is a division of application Ser. No. 800,184 filed Nov. 20, 1985 now U.S. Pat. No. 4,709,180.

BACKGROUND OF THE INVENTION

Field of the Invention

The present invention relates generally to the construction and configuration of a stator for electrical machines including both motors and generators, and more particularly to an improved stator construction utilizing a stator core in the form of a cylindrical ring lacking inwardly projecting teeth made of a magnetizable material, with the windings of the stator being supported by a support structure made of non-magnetizable material effectively increasing the diameter of the magnetic air gap, the present invention providing a suitable stator structure for use with high magnetic energy permanent magnet rotors.

In the design and construction of permanent magnet machines, there are two considerations which dictate the design of an improved permanent magnet machine having great appeal to potential purchasers. These two factors are, first, the desire to minimize the cost of the machine, or to provide the most machine for the least money, and secondly to increase machine efficiency while reducing machine size by utilizing smaller sized higher energy product permanent magnets.

With regard to the first of these factors, the desire to minimize construction cost of a permanent magnet machine, it is apparent that the most labor-intensive component of a permanent magnet machine to assemble is the stator, which is typically assembled by winding coils of wire around teeth contained on an iron stator core. In cross-section, a typical stator core resembles a cylinder with T-shaped teeth extending radially inwardly. It may be appreciated that winding the stator windings onto the T-shaped teeth of the stator core is therefore a labor intensive, and hence expensive, process.

It is apparent that in order to achieve a significant reduction in the cost of assembling a permanent magnet machine, it is necessary to redesign the stator to reduce the amount of labor needed to wind the stator windings onto the stator core. Accordingly, this accomplishment is an object of the present invention.

In recent years, high energy product permanent magnets representing significant energy increases over previously known permanent magnets have become available. For example, samarium cobalt permanent magnets having an energy product of 27 megagauss-oersted (MGO) have recently become available. In addition, neodymium-iron-boron magnets have recently become available which have an energy product of 35 MGO, and it appears that in the near future an energy product of at least 45 MGO will be achieveable by advanced permanent magnets.

A rotor making the maximum use of high energy product permanent magnets is disclosed in Assignee's concurrently filed U.S. patent application Ser. No. 800,183, issued May 19, 1987 as U.S. Pat. No. 4,667,123 entitled "Two Pole Permanent Magnet Rotor Construction for Toothless Stator Electrical Machines", which patent application is hereby incorporated herein by reference.

Theoretically, the use of such high energy product permanent magnets should permit increasingly smaller machines to be built which will be capable of supplying increasingly high power outputs. However, for a particular power output a smaller machine would have approximately the same amount of losses as a larger machine, and since its size is smaller the losses per volume of machine would be higher, resulting in a high watts loss density.

Such a high watts loss density would make direct liquid cooling virtually mandatory in order to allow the smaller machine to operate on a continuous basis. Unfortunately, it is quite difficult to achieve direct liquid cooling in conventional iron lamination toothed stator designs. High copper fill factors and varnish-impregnated slot cells substantially inhibit the free flow of liquid coolant through the copper windings. In addition, since the copper is thermally isolated from the coolant by electrical insulators required between the copper windings and the laminations forming the stator core, cooling of the stator core is not substantially effective.

It is therefore apparent that a new design of the machine stator must include provision for effective liquid cooling if the high energy product permanent magnets are to be used effectively. It is therefore an object of the present invention to provide a stator for use with such magnets which may be effectively cooled by liquid coolant flow.

An additional problem encountered in the use of high energy product permanent magnets is that of providing a path for magnetic flux to flow through the stator core. Since a laminated stator core has a maximum flux density which may be effectively circulated therethrough, with the use of high energy product permanent magnets the size of the T-shaped radially inwardly extending teeth of the stator core must be increased. This increase in size in the teeth of the stator core results in less slot area for stator windings to occupy. Accordingly, while flux is increasing, slot area in which stator windings may be wound is simultaneously decreasing, thereby resulting in a performance plateau and in the ineffective use of the high energy product permanent magnets.

Two other problems associated with conventional stators are cogging and a relatively high magnetic spring rate. Cogging is a phenomenon whereby the preferred path of magnetic flux is the path of least reluctance. A rotor will have preferred positions it will move to at rest, resulting in a high cogging torque, which is the torque needed to overcome the cogging phenomenon. The solution to cogging has been a skewing of the stator teeth, resulting in a helical shape which produces a smooth running machine. It is desireable to eliminate cogging without skewing stator teeth.

Another problem is associated with the magnetic spring rate of a rotor within a stator. The magnetic spring rate is the force urging the rotor in a radial direction. It may be appreciated that such a force is applied to the bearings of the rotor, and will result in bearing wear. The only way to reduce the magnetic spring rate is to increase the magnetic air gap, and this is also an object of the present invention.

It is therefore necessary for an improved stator for permanent magnet machines to provide the maximum possible slot area for stator windings, and to prevent the slot area for stator windings from being diminished by the use of a higher energy product permanent magnet in the rotor. In fact, it is an object of the present invention to maximize the slot area by redesigning the construction of the stator to allow the maximum possible amount of stator windings to be installed on the stator.

SUMMARY OF THE INVENTION

The present invention eliminates completely the teeth previously utilized in stator cores, between which teeth are the slot cells in which stator windings were installed. The present invention instead uses a winding support structure made of non-magnetizable material in a cylindrical configuration with a plurality of radially outwardly extending, longitudinal support fins installed thereon, the support fins also being made of non-magnetizable material and preferably manufactured integrally with the cylindrical portion.

The copper windings may be conveniently installed in the areas between adjacent support fins on the winding support structure. Since the support fins and the winding support structure need not carry magnetic flux, they can be relatively thin, thereby maximizing the slot area in which the stator windings may be installed around the winding support structure. Since the support fins extend radially outwardly unlike the T-shaped teeth of a conventional stator core, the stator windings may be prewound on a form and easily dropped into the slot cells between the support fins. Also, the cylindrical portion of the winding support lends itself well to the creation of a bore seal and a channel through which liquid coolant may be circulated. Since the material of the winding support structure is not a conductor, additional insulation is unnecessary. Rotational movement of the winding support is inhibited by use of a pin through the winding support and a portion of the housing structure.

A cylindrical flux collector ring is installed over the winding support structure carrying the stator windings. The flux collector ring may typically be made of laminated magnetizable material, and is formed as a cylinder closely surrounding the outwardly extending tips of the support fins carried by the winding support structure. A cylindrical layer of insulating liner may be installed between the stator windings and the flux collector ring to insulate the stator windings from the flux collector ring. As mentioned above, it is important to note that since the support fins and the winding support structure are made of a non-magnetizable, non-conductive material, additional slot lining insulation layers need not be installed between the intersections of the stator winding and the support fins and the winding structure. Since there are no teeth in the stator, cogging is eliminated completely since with no teeth there is no preferred rotor position. The result is a smooth-running machine without skewing of the stator.

The winding support structure is mounted in a cylindrical housing having end bells, which, together with the cylindrical portion of the winding support structure, provides a chamber through which coolant fluid may be flowed through the winding area to cool the stator. Due to the greatly reduced amount of insulation required in the stator construction of the present invention, and to the eliminated need for varnish impregnation of slot cells due to the novel construction of the present invention, the pumping of liquid coolant through the copper windings is not substantially inhibited. Therefore, the stator of the present invention is easily and efficiently adaptable to the liquid cooling necessary to allow substantially greater power density.

It is apparent that since the windings may be installed into the outside of the winding support structure between the support fins, it is substantially easier and less labor-intensive to install the stator windings. As a result, the stator windings may be easily prefabricated and then merely laid between the support fins of the winding support structure, after which the flux collector ring is slipped over the winding support structure.

It is therefore to be appreciated that the stator of the present invention is substantially easier and cheaper to manufacture than stators utilizing stator cores having inwardly projecting teeth. In fact, the labor cost in manufacturing the stator is reduced by over 50%, representing a substantial savings in cost of manufacture of a machine having the stator of the present invention.

It may also be appreciated that the present invention makes efficient use of high energy product permanent magnets. Although the magnetic air gap of a machine constructed according to the present invention is increased, thereby substantially reducing the magnetic spring rate and bearing wear due to magnetic spring rate, the overall operating efficiency of the machine is substantially increased over conventional designs due to the use of high energy product permanent magnets. Overall operating efficiency of a machine constructed according to the teachings of the present invention are thusly substantially higher than the efficiency of a conventional machine, particularly when the machine is a two pole machine. Since the slot area remains essentially constant with increasing magnetic energy, the effective amount of flux increases with increasing magnetic energy, resulting in reduced copper losses due to the reduced number of winding turns required to produce a given output, and the increased slot area available, and thus efficiency of operation is increased. In addition, since liquid cooling may be easily accomplished with the stator of the present invention, the use of the high energy product permanent magnets and the resulting high watts loss density is not a problem.

Since the present invention utilizes a stator core which is substantially cylindrical in shape, having no teeth, the tooth losses in a machine constructed according to the teachings of the present invention are effectively zero. Copper losses are somewhat less than those in a conventional machine, although the size of the copper strands used in the stator windings is reduced to prevent eddy currents which will be induced due to the toothless design of the stator, in which the magnetic flux cuts the wires. Core loss is also somewhat less than that in a conventional machine, and the relative total loss in a machine constructed according to the teachings of the present invention are approximately one-third less than the losses in a conventional machine. Accordingly, it is apparent that the present invention represents a highly desireable stator construction having the significant advantages enumerated above, and presenting no relative disadvantage in achieving these advantages.

DESCRIPTION OF THE DRAWINGS

These and other advantages of the present invention are best understood through reference to the drawings, in which:

FIG. 6 is a cutaway view of a machine constructed according to the teachings of the present invention;

FIG. 6A is an enlarged view of a portion of the flux collector ring and the support fins of the machine shown in FIG. 6;

FIG. 7 is a partial cross-sectional view of the machine shown in FIG. 6 illustrating the stator construction;

FIG. 7A is an enlarged view of a portion of FIG. 7;

FIG. 8 is an end view of the winding support structure;

FIG. 9 is a sectional view of the winding support structure of FIG. 8;

FIG. 10 is a plan view of one of the laminations making up the flux collector ring;

FIG. 11 is a graph of power per weight versus magnet energy product for a conventional machine, a toothless machine constructed according to the teachings of the present invention without liquid cooling, and such a toothless machine having direct liquid cooling.

DETAILED DESCRIPTION OF THE PREFERRED EMBODIMENT

Figure 1:
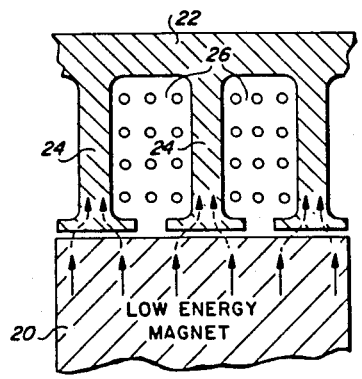
FIG. 1 is a schematic diagram of a portion of the stator of a conventional machine used with a low energy permanent magnet rotor.

FIG. 1 schematically illustrates a rotor 20 using low energy product permanent magnets therein, as well as a portion of the stator core 22 having radially inwardly projecting teeth 24. The stator core 22 and teeth 24 are typically made of electrical steel. Stator windings 26 are then wound between the teeth 24 in the slot areas around the inner circumference of the stator core 22.

Figure 2:
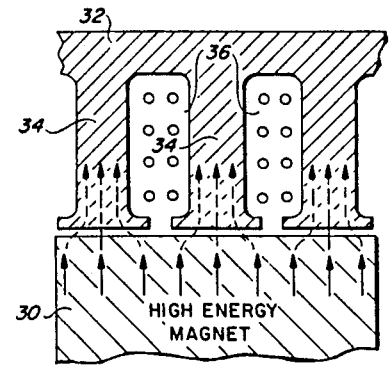
FIG. 2 is a schematic diagram of a portion of the stator of a conventional machine used with a high energy permanent magnet rotor.

In FIG. 2, a rotor 30 is illustrated which utilizes high energy product permanent magnets therein. Since there is more magnetic energy in the flux paths which must be completed by the stator core 32 and its teeth 34, it is therefore necessary that the teeth 34 of the stator core 32 be thicker to carry the increased magnetic flux therethrough to the outer cylindrical portion of the stator core 32 so that the flux may complete its magnetic path. As the size of the teeth 34 increases, there is less room for stator windings 36 in the slot areas between the teeth.

Figure 3:
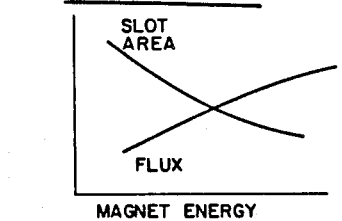
FIG. 3 is a graph plotting both flux and slot area versus magnet energy for a conventional machine such as those shown in FIGS. 1 and 2.

In FIG. 3, plots of slot area versus increasing magnet energy and flux versus increasing magnet energy are shown, for the motor which is schematically illustrated in FIGS. 1 and 2. As is apparent from the plots in FIG. 3, as the amount of flux to be transmitted through the teeth 34 and through the rest of the stator core 32 increases, the slot area between the teeth 34 decreases, meaning that there is less room for the stator windings 36. The result is a performance plateau, and the increased magnetic energy product generated by state-of-the-art magnets is not effectively utilized.

Figure 4:
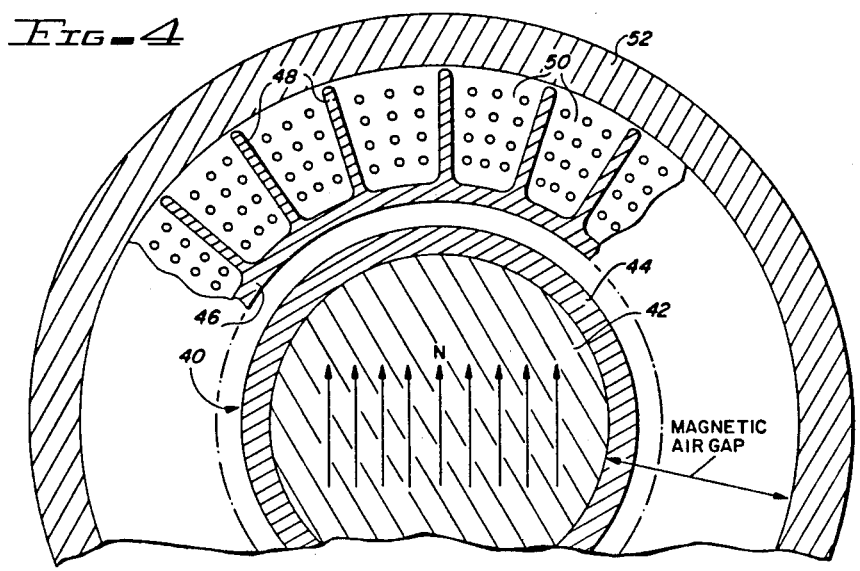
FIG. 4 is a schematic cross-sectional view of a stator constructed according to the teachings of the present invention and shown with a two-pole rotor.

This problem has been eliminated by the present invention, which is shown in schematic fashion in FIG. 4. A two pole rotor assembly 40 is illustrated, although the present invention has application to rotors having more than two poles. The two pole rotor assembly 40 is comprised of a two pole permanent magnet rotor 42 which is surrounded by a rotor retaining sleeve 44 made of non-magnetizable material.

The construction of the stator illustrated in FIG. 4 differs substantially from previous stator designs in that the windings are not mounted on teeth made of magnetizable material. Rather, a winding support structure 46 made of non-magnetizable, non-conductive material is used, which winding support structure has a cylindrical portion with radially outwardly extending longitudinal support fins 48 mounted thereon. The support fins 48, which extend longitudinally along the cylindrical portion of the winding support structure 46 except at the two ends thereof, provide the areas into which stranded stator windings 50 may be inserted. Note that the stator windings 50 are shown schematically in FIG. 4, without the reduced number of insulators which are still required, which will be described later in conjunction with FIGS. 7 and 7A. The two ends of the cylindrical portion f the winding support structure 46 do not have fins to allow the portions of the stator windings 50 lying between the support fins 48 to be interconnected at the ends of the winding support structure 46, as is conventional. The support fins 48 and the cylindrical portion of the winding support structure 46 are preferably constructed in integral fashion.

It may be at once perceived that the stator windings 50, since they may be laid into the outer side of the winding support structure 46, may be prefabricated, which prefabrication was of course not possible with the stator core and tooth designs shown in FIGS. 1 and 2. Prefabrication of the stator windings 50 greatly reduces the labor required to manufacture the stator. In addition, since teeth are not used in the stator, the cogging phenomenon is eliminated. This results in a smoother running machine with a lower starting torque requirement, without a skewed stator and its attendant problems.

The flux path is completed by a cylindrical flux collector ring 52 which is typically of laminated construction, and is made of ferromagnetic material which is mounted about the outer periphery of the winding support structure 46, with the flux collector ring 52 extending around the outermost edges of the support fins 48 on the winding support structure 46. It may therefore be appreciated that the stator windings 50 are located on the outside of the cylindrical portion of the winding support structure 46 and in the slot areas between the support fins 48, and are also contained inside the flux collector ring 52.

As illustrated in FIG. 4, the magnetic air gap of this machine extends from the outer periphery of the two pole permanent magnet rotor 42 to the inner periphery of the flux collector ring 52. Such a large magnetic air gap would not be feasible with low energy product magnets, but recently developed high energy product magnets make the large magnetic air gap a relatively easy problem to overcome. In order to make the schematically illustrated machine in FIG. 4 practical, it is only necessary that the magnets in the two pole rotor 42 are high energy product magnets such as samarium cobalt or neodymium-iron-boron magnets, the former of which are presently available with magnetic energy products of 27 MGO, and the latter of which are available with magnetic energy products of 35 MGO. The increased magnetic air gap results in two things—first, the magnetic spring rate of the machine is reduced substantially, as for example a factor of five. Secondly, the increased magnetic air gap means that the number of conductors per phase may be reduced for a given voltage output. This results in larger conductors with less resistance, for a lower I²R loss.

Figure 5:
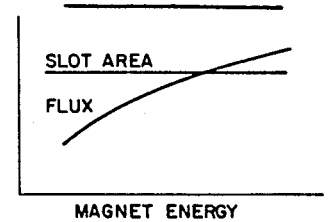
FIG. 5 is a graph plotting both slot area and flux versus magnet energy for a machine constructed according to the teachings of the present invention.

Slot area versus increasing magnet energy and flux versus increasing magnet energy are plotted for the device illustrated in FIG. 4 in FIG. 5. It is apparent that since teeth are not used to transmit the magnetic flux as in the previously known machines illustrated in FIGS. 1 and 2, the thickness of the support fins 48 on the winding support structure 46 are minimal since they only function to support and separate the stator windings 50. Therefore, slot area is constant with changing magnet energy and further is maximized by use of a winding support structure 46 made of non-magnetizable material. With the design of the machine illustrated in FIG. 4, increased magnet energy results in an improved machine rather than in a machine which may not be improved due to reduced slot area available.

There are two important considerations involved in the practical design of the machine illustrated schematically in FIG. 4. First of all, since the magnetic flux generated by the magnets in the two pole rotor 42 will be flowing directly through the stator winding 50, rather than going substantially around them through the teeth, the conductor strands used in the stator winding 50 must be kept small to minimize eddy current losses. This requirement does not provide a significant problem, however, since the stator windings 50 may be wound on a form and then inserted between the support fins 48 on the winding support structure 46. By making the size of the stranding in the conductors of the stator windings a fairly small diameter, eddy currents are minimized. Examples of wire size used will be provided later following discussion of actual construction of a machine according to the principles taught by the schematic machine illustrated in FIG. 4.

The second problem with use of high energy product permanent magnets in a high speed machine is that the size of the machine is decreased dramatically, which results in a higher watts loss density for the machine, a factor which requires liquid cooling in most cases to provide a practical machine capable of continuous operation. However, as will be illustrated in the specific example to follow, a stator constructed according to the teachings of the present invention is particularly adaptable to direct liquid cooling of the copper stator conductors.

Moving now to the specific construction of the machine illustrated in FIGS. 6, 6A, 7, and 7A, an electrical machine 56 is illustrated which has a housing 58. The housing 58 is essentially cylindrical, and has two end bells 60, 62, each of which end bells 60, 62 includes smaller concentric cylindrical bearing support areas 64, 66, respectively, located in the centers of the end bells 60, 62. The assembly consisting of the housing 58 and the end bells 60, 62 is sealed. A permanent magnet rotor 70 is supported within the housing 58 on bearings 72, 74, which bearings 72, 74 are mounted in the cylindrical bearing support areas 64, 66, respectively.

A winding support structure 80 is illustrated in FIGS. 8 and 9, and is essentially cylindrical with a plurality of longitudinally extending support fins 82 extending radially outwardly from the cylindrical portion of the winding support structure 80, with slot areas located between adjacent support fins 82. In the preferred embodiment illustrated in the figures, the winding support structure 80 has 36 support fins 82 mounted thereon, and hence 36 slot areas located between the 36 support fins 82. It should be noted that the number of slot areas may vary as in conventional stators. The winding support structure 80 is made of non-magnetizable material, typically a high temperature engineering plastic, with the support fins 82 and the cylindrical portion of the winding support structure manufactured integrally. In the preferred embodiment, a plastic such as polyamide-imide is used, which is commercially available as Torlon 5030.

It may be noted from FIG. 9 that the 36 support fins 82 are longitudinally mounted on the cylindrical portion of the winding support structure 80 intermediate the two ends, with portions at both ends of the cylindrical portion of the winding support structure 80 not carrying the support fins 82. Hence, the cylindrical portion of the winding support structure 80 is somewhat longer than the support fins 82, and extends from the support fins at both ends of the winding support structure 80. As mentioned above, the ends of the winding support structure 80 not carrying the support fins 82 are where the interconnections between the portions of stator windings 86 lying in the slot areas between the support fins 82 are made.

The stator windings 86 may be prefabricated on forms, and then laid into the slot areas between the support fins 82 on the winding support structure 80. The stator windings 86 will typically include two conductors installed into each slot area, each of which conductors may have multiple turns. Since the two conductors installed into each slot are different phases, they are separated by an insulator strip 88. Therefore, each winding slot will contain two conductors separated by an insulating strip 88.

The stator windings 86, as stated above, are of substantially smaller diameter wire than in previous stator designs. For example, in a small 200 watt machine each of the conductors may, for example, be made up of 28 strands of #37 AWG wire. As another example, consider a large 5M watt machine which in each conductor may, for example, be made up of 2,580 strands of #31 AWG wire. As stated above, the purpose of using such fine wire is that eddy currents are greatly reduced by using smaller size wires, an important consideration since all of the flux from the rotor will cut the wire in slot areas in a toothless stator design. Note also that the stator windings 86 are shown in highly schematic rather than actual form in FIGS. 6, 7, and 7A.

Once the stator windings 86 have been wound and are mounted in the slot areas around the winding support structure 80, a flux collector ring 90 made of magnetizable material such as electrical steel may be installed around the outer periphery of the winding support structure 80 containing the stator windings 86. Since the flux collector ring 90 is made of magnetizable material which is typically conductive, a cylindrical layer of insulating liner 91 must be installed between the inner diameter of the flux collector ring 90 and the outer diameter of the winding support structure 80 carrying the stator windings 86. It is important to note that since the winding support structure 80 is a non-conductor, the only insulators necessary are the insulating strips 88 and the insulating liner 91. The stator windings 86 need not be impregnated with varnish, and therefore may easily be cooled by flowing coolant through the stator windings 86.

The flux collector ring 90 is preferably made of a plurality of flux collector ring laminations 92 as shown in FIG. 6A, and one of the flux collector ring laminations 92 apparent that each flux collector ring lamination 92 is cylindrical with four raised portions 93 arranged around the outer periphery of the flux collector ring lamination 92. The raised portions 93 function to support the flux collector ring 90 inside the housing 58 while allowing coolant to flow between the flux collector ring 90 and the housing 58. Note that in smaller machines a ferrite core may be substituted for the laminated construction of the flux collector ring 90.

The assembled flux collector ring 90 is installed over the winding support structure 80 carrying the stator windings 86 with the insulating liner 91 therebetween, and the resulting assembly is then mounted inside the housing 58 as illustrated in FIGS. 6 and 7. Note that the inner diameter of the ends of the cylindrical portion of the winding support structure 80 are mounted in interference fit fashion around the outer diameter of the cylindrical bearing support areas 64, 66 at the ends of the housing. A chamber or channel is thereby formed between the interior of the housing 58 and the outer surfaces of the winding support structure 80 through which coolant may be flowed. The housing has a coolant inlet channel 94 at one end of the housing, and a coolant outlet channel 96 at the other end of the housing. It may therefore be appreciated that coolant may be flowed into the housing 64 through the coolant inlet channel 94, through the unvarnished stator windings 86 and around the flux collector ring 90, and out of the housing 58 through the coolant outlet channel 96 to cool the stator assembly of the machine 56. An additional aperture 97 in the housing 58 is used to bring the winding leads 98 from the stator windings 82 through the housing 58, which aperture 97 is sealed to prevent coolant leaks.

Performance of a machine built according to the teachings of the present invention both with and without direct liquid cooling is illustrated in FIG. 11 as compared with a conventional machine. It is apparent that for high energy product magnets the toothless design is more powerful than is the conventional design, and that the toothless design with direct liquid cooling is substantially more powerful than either of the other two designs. By constructing a stator according to the teachings of the present invention, it is apparent that a machine smaller both in size and weight than conventional machines may be constructed to provide a given power output.

The machine illustrated in the figures may be constructed at substantially lower cost than a conventional machine due to the reduced labor required to assemble the stator. The stator windings 86 may be prewound around a form and then laid into a groove between the support fins 82 on the winding support structure 80. In fact, it has been found that the labor cost to wind the stator has been reduced by greater than 50% by the design of the present invention. It is therefore apparent that a machine constructed according to the teachings of the present invention will have both higher efficiency and lower cost than previously known machine designs.

Another significant advantage of the present invention is that overall losses are reduced by over one-third. There is no tooth loss since the design of the present invention is a toothless stator. Copper losses are reduced as well. The present invention then teaches the construction of a machine having lower losses, lower cost of construction, smaller size for the same power rating, and substantially higher efficiency. It is therefore apparent that the present invention represents a significant step in the state of the art, and a highly advantageous construction for electrical machines.

What is claimed is:

1. A method of making a stator for an electrical machine comprising:
   providing a winding support structure made of a non-magnetizable, non-conductive material, said winding support structure having a cylindrical portion with a plurality of thin longitudinal support fins which extend radially outwardly from said cylindrical portion, said support fins providing therebetween a plurality of slot areas;
   forming a plurality of fine stranded conductors into a plurality of stator windings;
   laying said plurality of stator windings into said plurality of slot areas within said winding support structure;
   mounting a substantially cylindrical flux collector ring made of ferromagnetic material around the outer periphery of said winding support structure, said collector ring thereby extending around the outermost edges of said support fins; and
   installing said winding support structure, said stator windings and said cylindrical flux collector ring into a housing, said housing extending from the one end of said winding support structure around the outer diameter of said flux collector ring to the other end of said winding support structure, said one end and said other end of said winding support structure sealably contacting said housing, said housing having a cooling inlet and a cooling outlet adapted for coolant flow through said stator windings.

2. The method of claim 1 further comprising:
   providing insulation means for preventing conduction between said stator windings and said flux collector ring.

3. The method of claim 1 further comprising:
   installing insulation strips between different phase conductors installed in the same slot area.

4. The method of claim 1 further comprising:
   forming said flux collector ring from a plurality of thin substantially cylindrical ferrite rings.

5. The method of claim 1 further comprising:
   molding said winding support structure from a high temperature engineering plastic.

6. The method of claim 1 further comprising:
   forming said winding support structure from polyamide-imide.

* * * * *